United States Patent
Jeakle et al.

(10) Patent No.: US 9,180,762 B2
(45) Date of Patent: Nov. 10, 2015

(54) CONSTANT SEAL GAPS FOR REMOVABLE VEHICLE PANELS

(71) Applicant: Continental Structural Plastics, Inc., Auburn Hills, MI (US)

(72) Inventors: Patrick T. Jeakle, Auburn Hills, MI (US); Steve Saje, Auburn Hills, MI (US)

(73) Assignee: Continental Structural Plastics, Inc., Auburn Hills, MI (US)

( * ) Notice: Subject to any disclaimer, the term of this patent is extended or adjusted under 35 U.S.C. 154(b) by 0 days.

(21) Appl. No.: 14/308,015

(22) Filed: Jun. 18, 2014

(65) Prior Publication Data
US 2014/0368001 A1    Dec. 18, 2014

Related U.S. Application Data

(60) Provisional application No. 61/836,156, filed on Jun. 18, 2013.

(51) Int. Cl.
*B60J 7/11* (2006.01)
*B60J 10/10* (2006.01)
*B60J 7/00* (2006.01)

(52) U.S. Cl.
CPC *B60J 7/11* (2013.01); *B60J 7/0084* (2013.01); *B60J 10/10* (2013.01)

(58) Field of Classification Search
CPC ............ B60J 7/0084; B60J 7/106; B60J 7/11; B60J 10/12
USPC ......................... 296/213, 218, 216.06–216.09
See application file for complete search history.

(56) References Cited

U.S. PATENT DOCUMENTS

| | | | | |
|---|---|---|---|---|
| 2,556,062 | A * | 6/1951 | Buehrig | 296/218 |
| 3,712,665 | A * | 1/1973 | Klein | 296/218 |
| 4,582,358 | A * | 4/1986 | Draper | 296/213 |
| 5,234,250 | A * | 8/1993 | Hattass et al. | 296/216.09 |
| 5,527,081 | A | 6/1996 | Rausch et al. | |
| 6,168,231 | B1 | 1/2001 | Fielding et al. | |
| 6,189,961 | B1 | 2/2001 | Poliskie et al. | |
| 6,382,702 | B1 | 5/2002 | Kasparak et al. | |
| 6,641,202 | B2 | 11/2003 | Graf et al. | |
| 6,685,252 | B2 | 2/2004 | Graf et al. | |
| 6,988,767 | B2 * | 1/2006 | Schlachter et al. | 296/218 |
| 7,032,960 | B2 | 4/2006 | Roehl | |
| 7,438,344 | B2 | 10/2008 | Williams et al. | |
| 7,464,985 | B2 | 12/2008 | Kapshandy et al. | |
| 7,578,549 | B2 | 8/2009 | Betzl et al. | |
| 2004/0145219 | A1 | 7/2004 | Doncov et al. | |
| 2005/0264030 | A1 | 12/2005 | Gervasi | |
| 2006/0208536 | A1* | 9/2006 | Prosser et al. | 296/190.08 |
| 2007/0145784 | A1 | 6/2007 | Kapshandy et al. | |
| 2008/0061603 | A1 | 3/2008 | Romig | |
| 2008/0129075 | A1 | 6/2008 | Williams et al. | |
| 2008/0136219 | A1 | 6/2008 | Berryhill et al. | |
| 2008/0224503 | A1 | 9/2008 | Betzl et al. | |
| 2009/0021054 | A1 | 1/2009 | Knape et al. | |

(Continued)

*Primary Examiner* — Dennis H Pedder
(74) *Attorney, Agent, or Firm* — Avery N. Goldstein, Esq.; Blue Filament Law

(57) ABSTRACT

A vehicle roof water runoff management system is provided with an improved seal that has a constant seal gap between removable vehicle roof top panels and an adjoining fixed roof. The constant seal gap is maintained in the B-pillar interface area with the vehicle's roofing components. The vehicle roof water runoff management system offers improved manufacture and long term performance reliability over previous designs.

14 Claims, 11 Drawing Sheets

(56) References Cited

U.S. PATENT DOCUMENTS

| | | |
|---|---|---|
| 2009/0033128 A1 | 2/2009 | Hoelzel |
| 2009/0146465 A1* | 6/2009 | Lewis et al. ................... 296/218 |
| 2010/0019544 A1 | 1/2010 | Thiele |
| 2012/0228900 A1 | 9/2012 | Maltaverne |

* cited by examiner (Detail B)
(Prior Art)

(Detail A)
(Prior Art)

(Detail A)
(Prior Art)

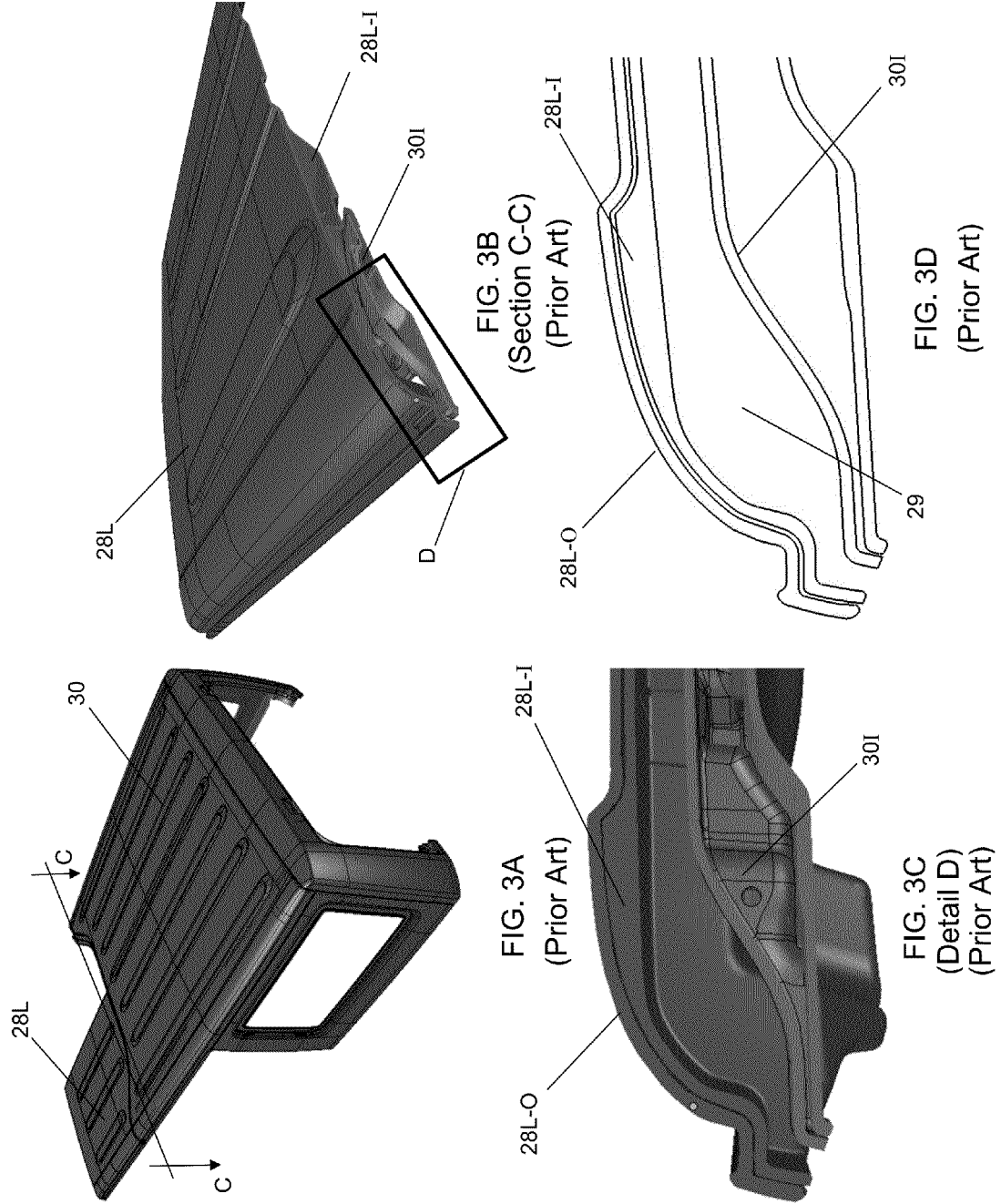

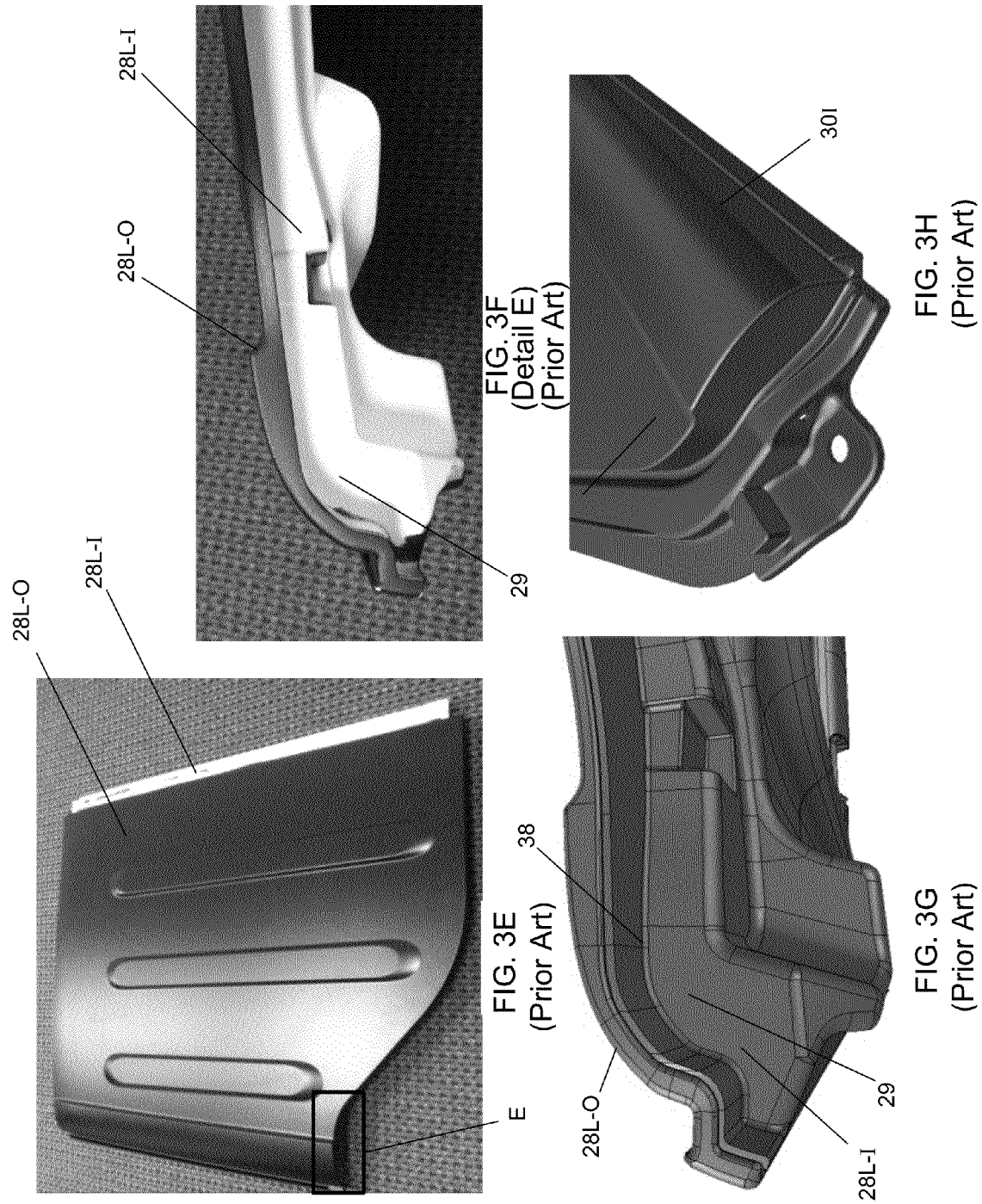

FIG. 3L (Section F-F) (Prior Art)

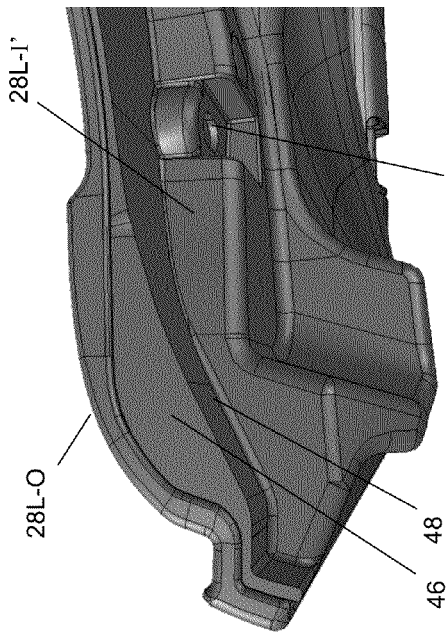
FIG. 4A
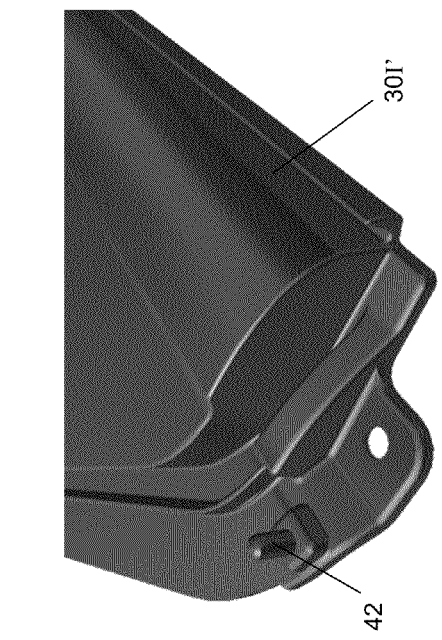
FIG. 4B
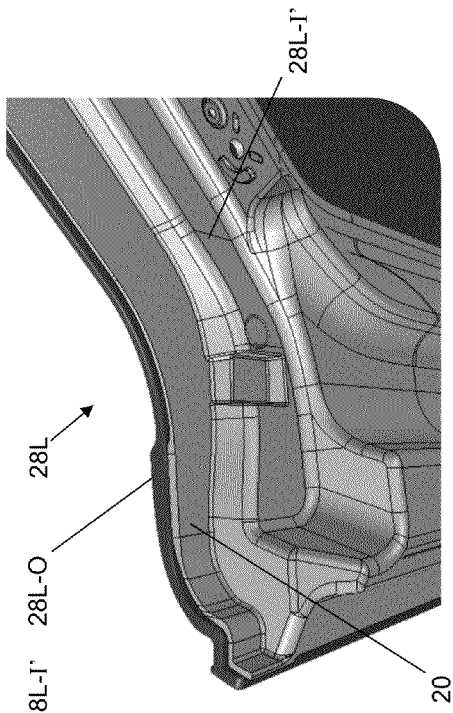
FIG. 5A
FIG. 5B
(Prior Art)

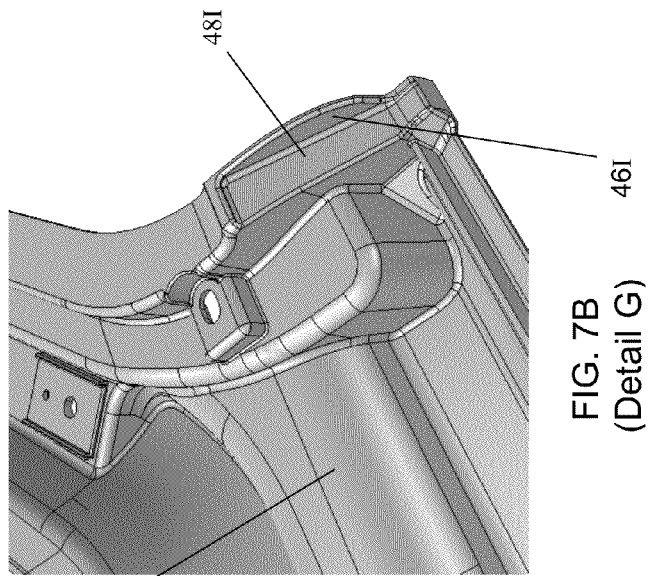
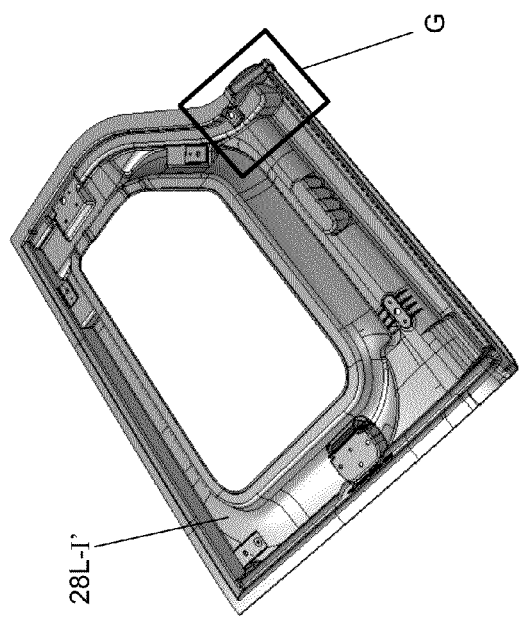
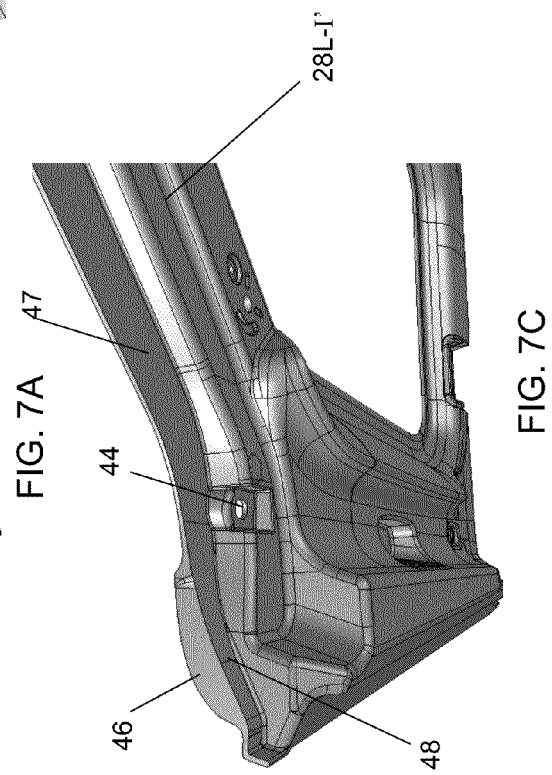
FIG. 7B (Detail G)
FIG. 7A
FIG. 7C (Section I-I)

(Section H-H)

CONSTANT SEAL GAPS FOR REMOVABLE VEHICLE PANELS

RELATED APPLICATIONS

This application claims priority benefit of U.S. Provisional Application Ser. No. 61/836,156 filed Jun. 18, 2013; the contents of which are hereby incorporated by reference.

FIELD OF THE INVENTION

The present invention in general relates to vehicle roof water runoff management and, more particularly, to improved sealing with a constant seal gap between removable vehicle roof top panels.

BACKGROUND OF THE INVENTION

Vehicles are generally constructed around a frame, where a vehicle's finished surface panels are secured or bonded to substructures to form body panels that are designed for attachment to the irregular surfaces of the frame. FIG. 1A shows a vehicle hood 10 formed with a finished surface outer panel 12 (see-thru surface) bonded at multiple points 14 to a structural inner panel 16 that may be stamped from sheet metal or formed from composite materials such as SMC. As shown, the periphery of outer panel (outer skin) 12 and structural inner panel 16 are bonded together at the edges 18. FIG. 1B is a cross section of a typical composite body panel peripheral flange where the class A outer panel 12 is bonded 14 (typically polyurethane or epoxy adhesive) or secured at a bond flange 20 of the structural inner panel 16. The hat section 22 of the structural inner panel 16 can be designed to follow the contour of a corresponding seal-carrying surface on a vehicle body. FIG. 1C is an isometric view of a body panel 24 where the bond flange 20 follows the contour of the finished surface outer panel 12.

Vehicles with removable hard top panels (28L-left, 28R-right), especially for sport utility vehicles (SUV) and jeeps 26, as shown in FIGS. 2A-2I, have become increasingly popular. The removable nature of the hard top panels (28L, 28R) requires weather-stripping and a water management system with a discharge path to direct water to a vehicles' exterior thereby ensuring the vehicles 26 occupants remain dry from rain and snow. FIG. 2D is a detailed view of FIG. 2C showing the molded weather stripping 32 on the mounting flange 30I (see FIGS. 2H and 2I), where "I" is an interior portion of the structural panel of the roof panel 30. FIG. 2E shows left removable panel 28L as removed from FIG. 2C. FIGS. 2G and 2H show the region where the roof panel 30 joins with removable panel 28L. In FIG. 2H, 28L is shown in transparency to show the overlap with mounting flange 30I, and the molded weather stripping 32 is absent. FIG. 2I shows the structural inner portion 30I and mounting flange with the molded weather stripping 32 absent. The roof 30 and removable panels 28 may be formed of aluminum, steel, or carbon fiber. Alternatively, the roof 30 and removable panels 28 may be formed of glass reinforced plastics and composites. Composites may include sheet molding compounds (SMC) or bulk molding compounds (BMC).

However, existing designs for sealing removable vehicle hardtop panels are not always affective and are prone to failure overtime, thereby leading to incursion of moisture to a vehicle interior. The moisture incursion is pronounced where the removable panels (28L, 28R) join together with each other and with the non-removable portion of a vehicle roof 30, and at the B-pillar 27 (see FIG. 2A). FIGS. 3A-3M are a series of views of an existing removable panel 28 and roof 30I interface at the B-pillar with stuffer materials to fill voids 29 at the B-pillar interfaces between the removable panels 28L and 28R and the roof 30I interface (see FIGS. 3D and 3I). The removable panel 28I has a ninety degree bend 38 which creates a vertical sealing at the B-pillar interface 40. The sealing stuffers in the void area 29 experience both a compressive and shear force which causes the stuffers 34 to tend to roll out of their intended position. As shown in FIG. 3M, four specially shaped pieces of foam 36 are required on every removable ("Freedom") Panel 28L or 28R, for each corresponding B-pillar corner interface 40 to combat leaks. However, the separate pieces of foam 36 are cumbersome and time consuming to place during vehicle assembly, and are also prone to failure over time.

Thus, there exists a need for an improved seal with constant compression between and along bond flanges for vehicles with removable top panels.

SUMMARY OF THE INVENTION

A vehicle removable roof system includes one or more removable top panels, the one or more removable top panels configured to engage with a fixed roof; where a contoured flange maintains a constant gap between the one or more removable top panels and the fixed roof. A weather strip is positioned in the constant gap, and experiences a compressive force between the one or more removable top panels and the fixed roof that is in some instance is limited to a generally orthogonal to the seal. The one or more removable top panels and the fixed roof further include a finished surface bonded to an interior structural portion formed of sheet molding composition (SMC) or bulk molding composition (BMC). The interior structural portion mounts to a vehicle frame.

BRIEF DESCRIPTION OF THE DRAWINGS

The present invention is further detailed with respect to the following drawings that are intended to show certain aspects of the present invention, but should not be construed as a limit on the practice of the present invention.

FIGS. 3A-3M are perspective views of the B-pillar interface between the removable vehicle hardtop panels and the roof;

FIGS. 4A and 4B are perspective views of the redesigned B-pillar interface for the roof panel and removable vehicle hardtop panels, respectively according to embodiments of the invention;

FIGS. 5A and 5B are comparison perspective views of the inventive redesigned removable panel that provides constant vertical compression and the existing removable hardtop panels, respectively;

FIGS. 7A-7D are a series of views of an inner structural portion of the removable top panels according to embodiments of the invention.

DESCRIPTION OF THE INVENTION

Figure 1A:
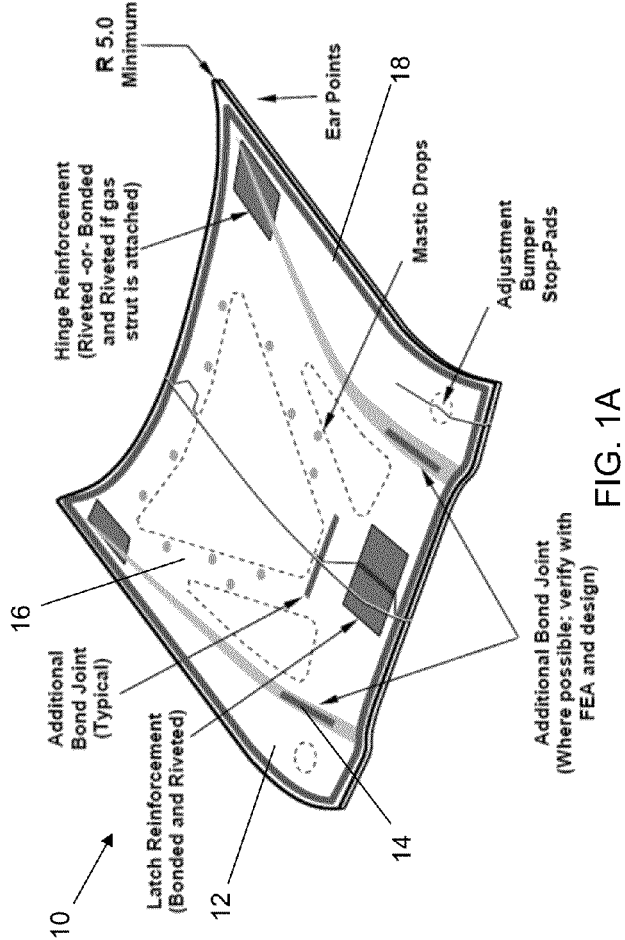
FIGS. 1A-1C are a series of views of body panel construction.
Figure 1C:
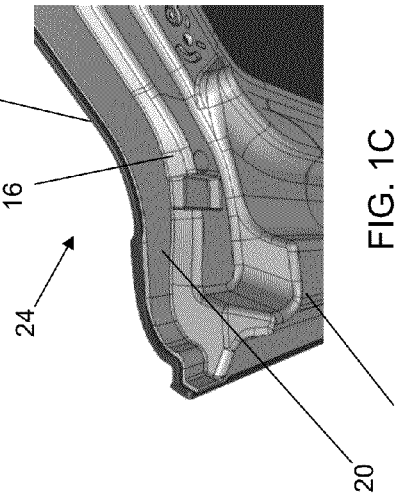
Figure 1B:
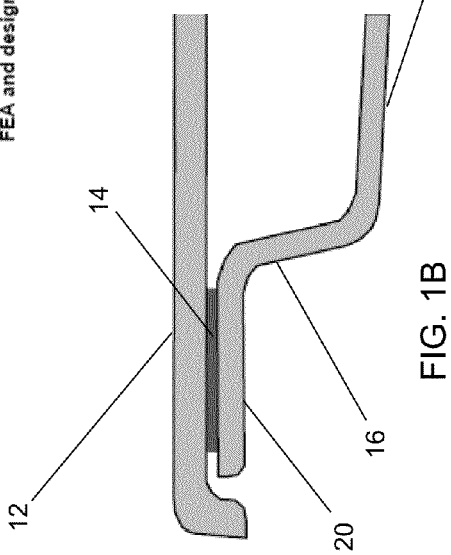

The present invention has utility as vehicle roof water runoff management system that provides an improved seal with a constant seal gap between removable vehicle roof top panels. In embodiments, the constant seal gap is maintained in the B-pillar interface area with the vehicle's roofing components. Embodiments of the inventive vehicle roof water runoff management system offer improved manufacture and long term performance reliability over previous designs.

As used herein, the terms "constant" and "generally" are intended to include those dimensions and forces that vary within 10 percent or less along the length of a given feature.

Referring now to FIGS. 4A and 4B an inventive design configuration is shown for the interface between the roof mounting flange 30I' and the removable panel 28L' (left side shown) at the B-pillar for use with embodiments of the vehicle roof water runoff management system. As shown in FIG. 4A the roof mounting flange 30I', which is an interior portion of the structural panel of the roof panel 30 in the vicinity of the B-pillar interface (i.e., where the top of the B-pillar meets the vehicle roof), has a 2-way locating pin 42 for interlocking with locating receptacle 44 of the interior structural portion 28L-I' of removable panel 28L. The interior structural portion 28L-I' has a dropped bond flange 48 that supports rib area 46. The dropped bond flange 48 ceases to bond against the outer finished surface panel 28L-O, and instead provides the contour needed for maintaining a constant seal gap to the roof mounting flange 30I' as will be shown in FIGS. 6C and 6D. FIG. 5A shows the inventive dropped flange 48 versus the existing flange structure 20 in FIG. 5B at the B-pillar interface for the removable panel 28L' and 28L, respectively. It is noted that the left side is being used for illustrative purposes, and that identical symmetric mirror image structures exist for the right side of the vehicle for 28R' and 28R.

Figure 6C:
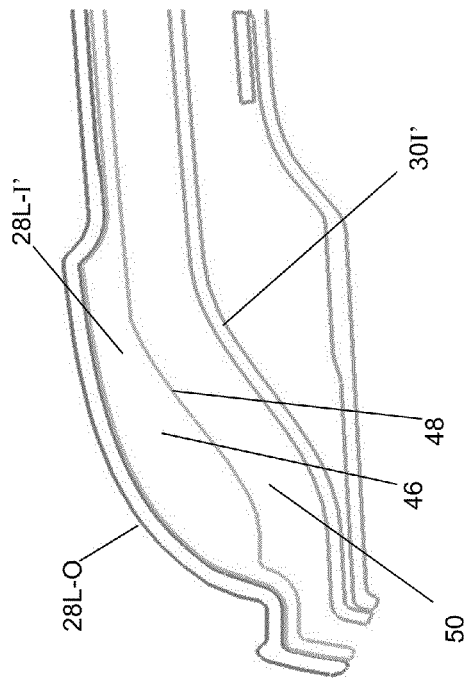
FIGS. 6C and 6D are cross sectional views of the B-pillar interface area between the inventive removable top and roof mounting flange that illustrates the constant gap and parallel compression surfaces.
Figure 6A:
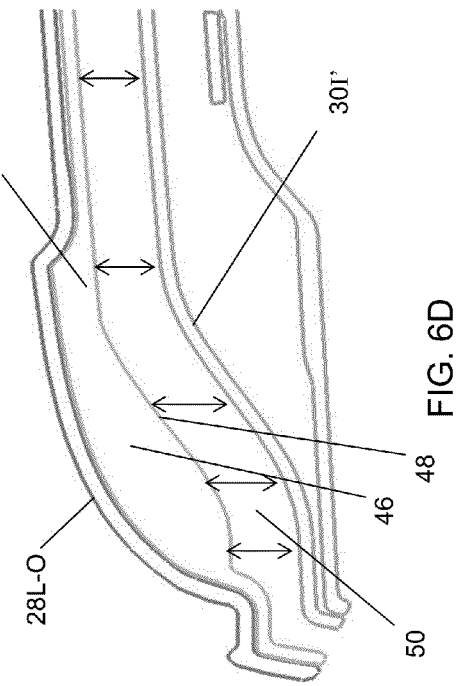
FIGS. 6A and 6B are cross sectional views of the existing B-pillar interface area between the removable top and roof mounting flange that illustrates the varying gap and non-parallel compression surfaces.
Figure 6D:
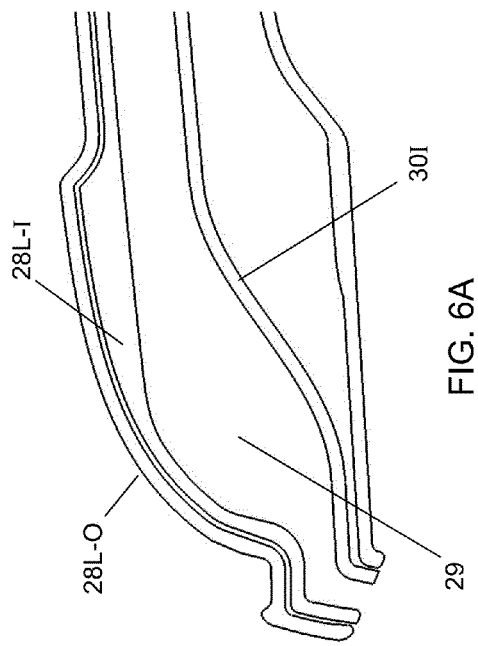
Figure 6B:
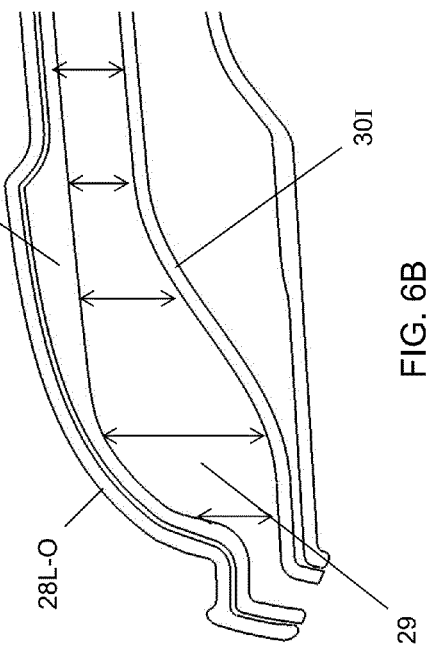
Figure 8A:
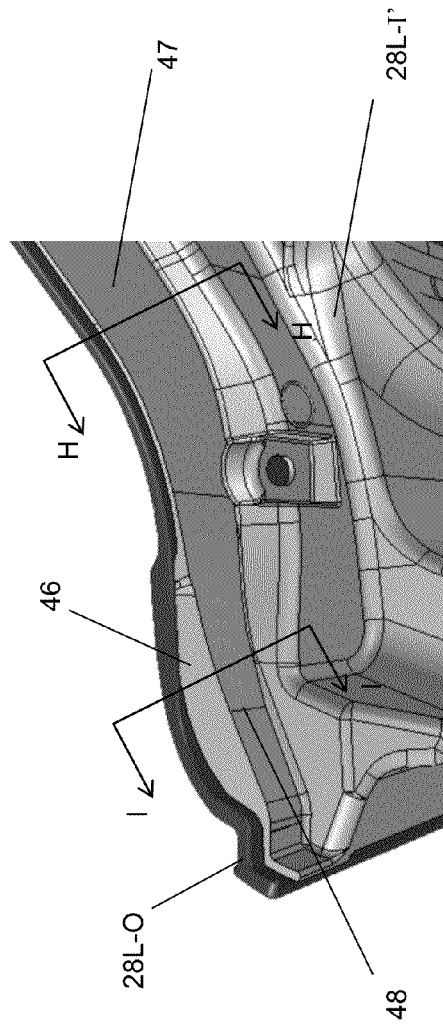
FIGS. 8A-8C are a series of cross sectional views of showing the compression of the seal in the B-pillar interface area between the removable panels and roof mounting flange according to embodiments of the invention.
Figure 8C:
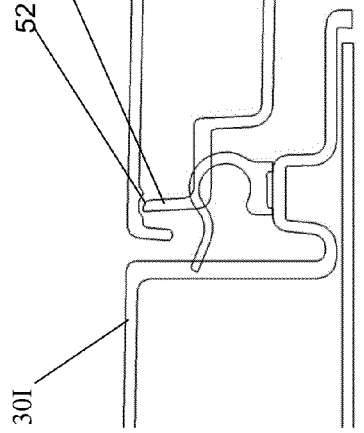
Figure 8B:
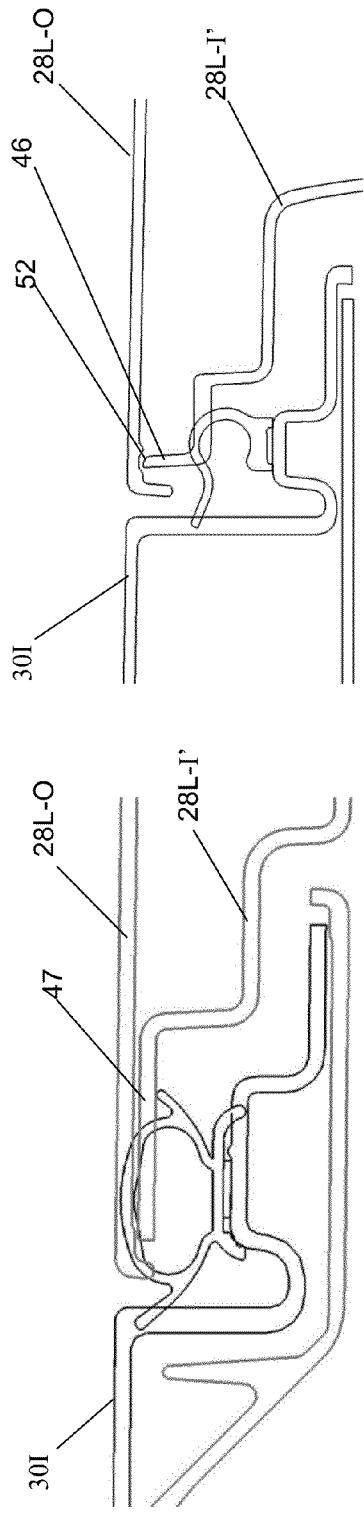

FIGS. 6A and 6B illustrate the existing design where the gap between the removable panel 28L interior structural portion 28L-I increases with respect to the roof mounting flange 30I in the B-pillar area. Insulating materials or fillers, such as noted above for sealing stuffers in the void area 29 experience both a compressive and shear force, due to the changing gap and vertical face of 28L-I, which causes the stuffers 34 to tend to roll out of their intended position. As shown in FIGS. 6C and 6D, dropped flange 48 eliminates the vertical face and maintains a constant gap 50 to the roof mounting flange 30I'. The constant gap 50 provides an even downward pressure to be applied to a weather stripping seal as is shown in the cross sectional views of FIG. 8A shown in FIGS. 8B-8C showing the compression of the seal in the B-pillar interface area between the removable panels and roof mounting flange, such that the seal is compressed in the Z direction only.

Figure 2B:
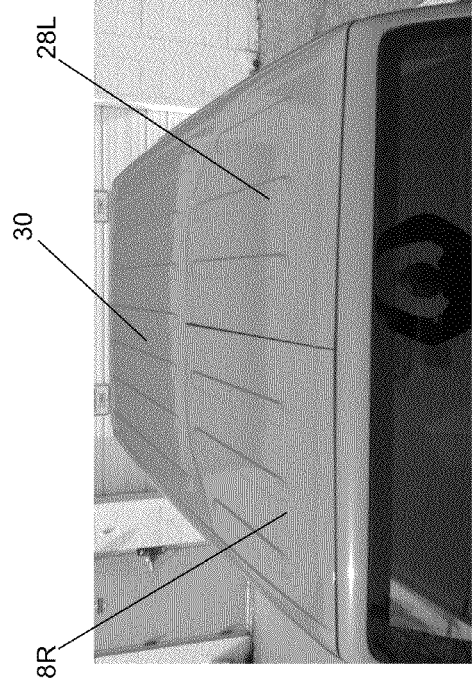
FIGS. 2A-2I are a series of perspective views of removable vehicle hardtop panels.
Figure 2A:
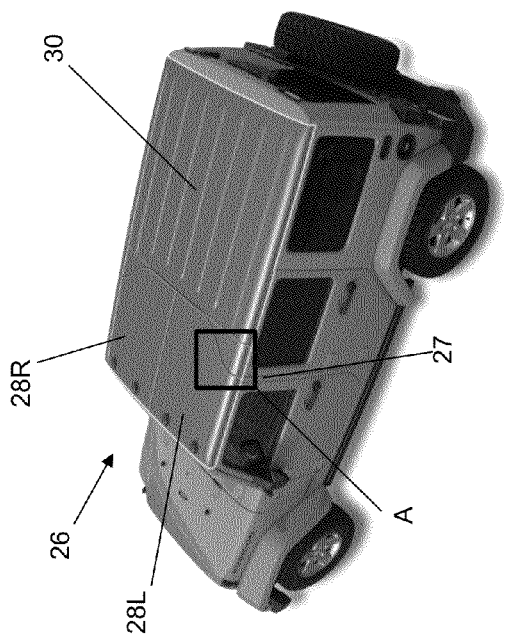
Figure 2E:
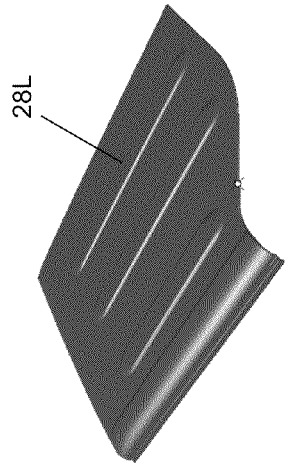
Figure 2D:
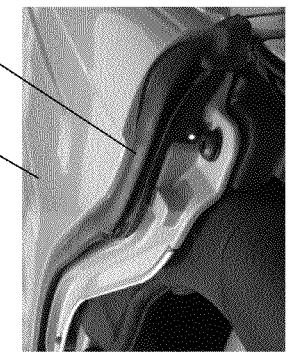
Figure 2C:
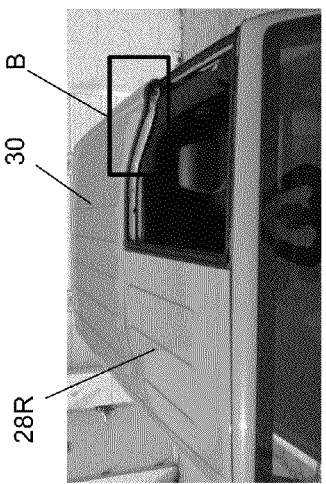
Figure 2G:
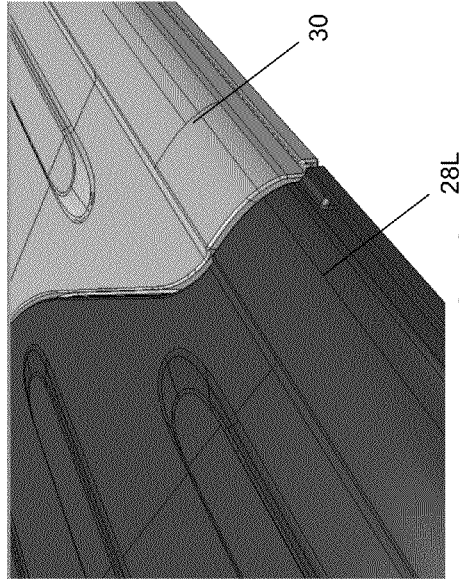
Figure 2I:
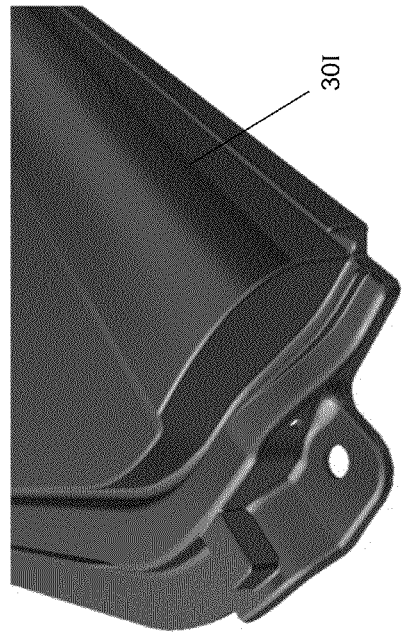
Figure 2F:
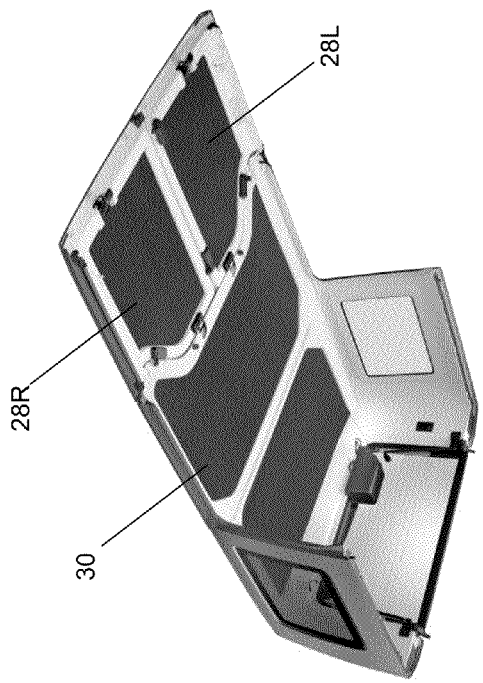
Figure 2H:
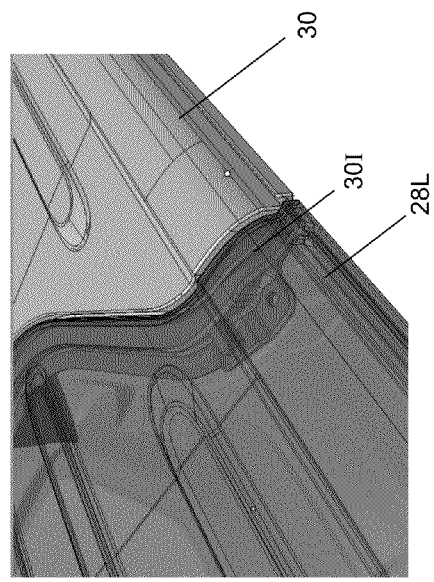
Figure 3I:
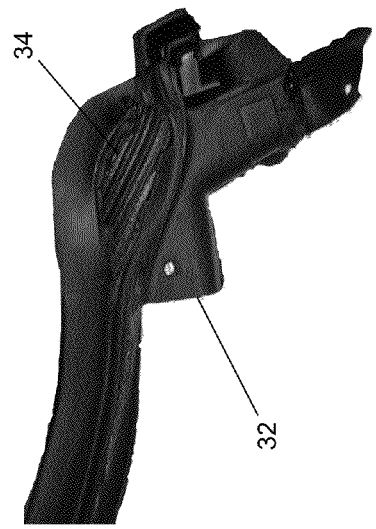
Figure 3K:
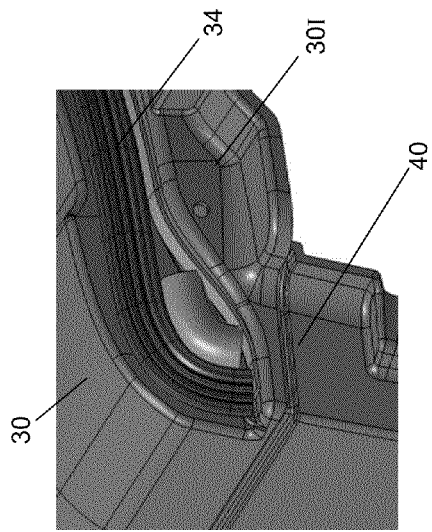
Figure 3J:
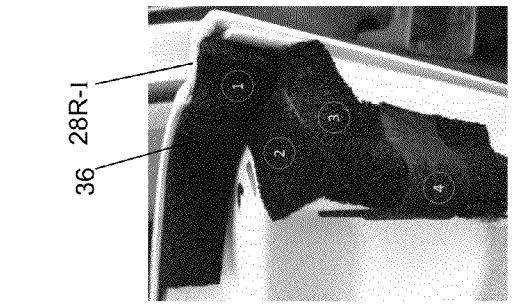
Figure 3M:
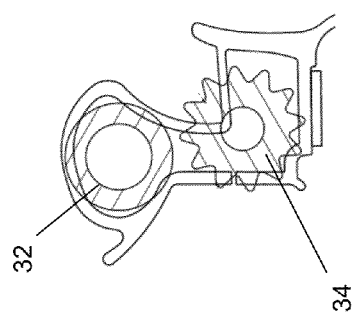
Figure 3M:
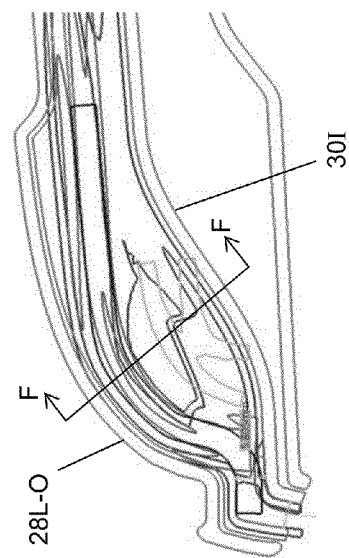
Figure 7D:
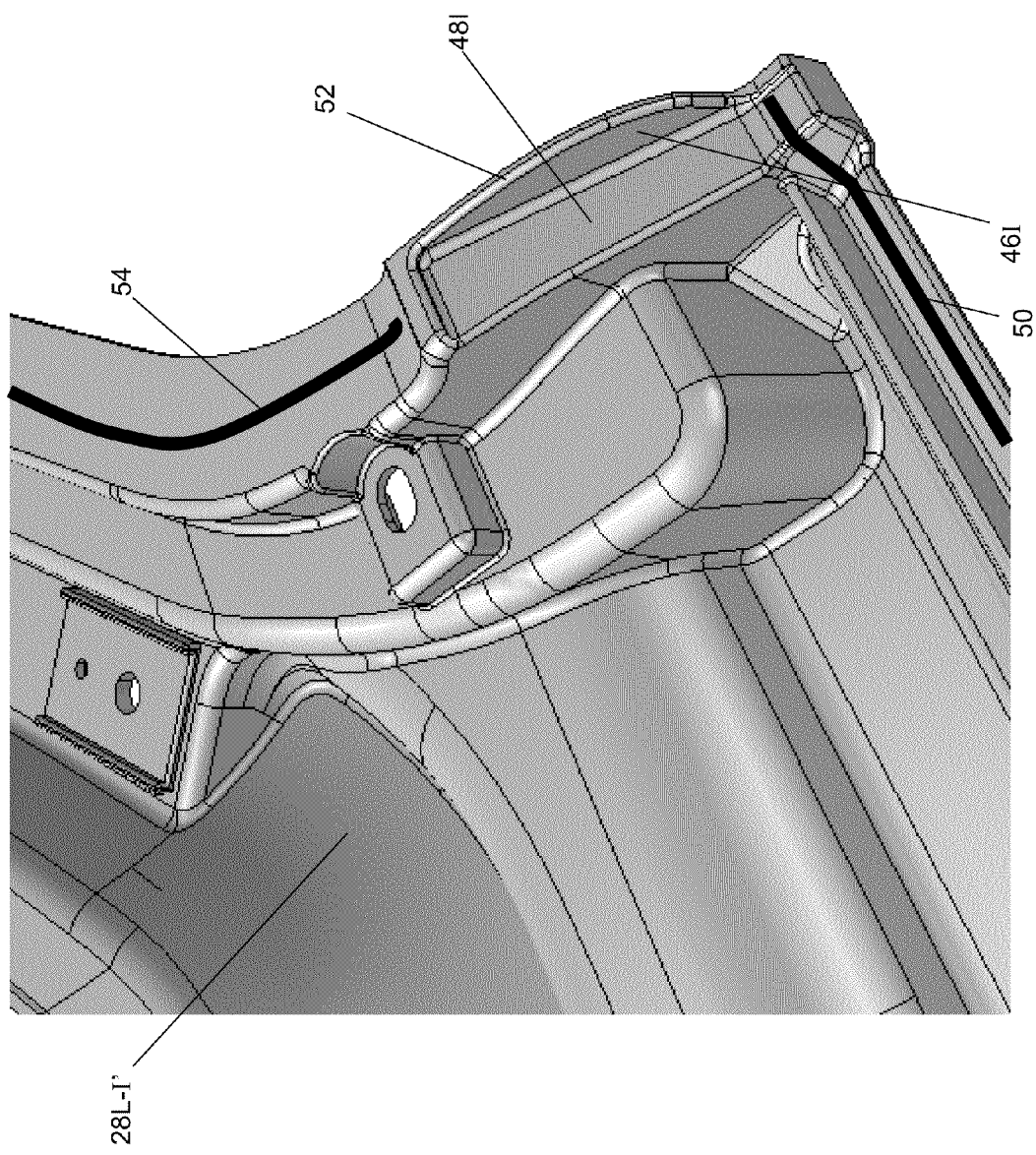

FIGS. 7A-7D show the interior structural portion 28L-I' of removable panel 28L with the outer finished surface panel 28L-O removed. FIG. 7A shows the side of the interior structural portion 28L-I' that is bonded to the outer panel. Also shown in FIG. 7A is detail G that is expanded in FIG. 7B that shows the interior side of the dropped flange 48I and upwardly extending rib 46 with the interior face 46I showing. FIG. 7C shows the portion of the removable panel 28L that is visible to vehicle occupants as also shown in FIG. 2F. FIG. 7D illustrates adhesive path 54 that is applied to the interior structural portion 28L-I' that is bonded to the outer panel 28L-O, and further illustrates the local omission of bonding in the area of the dropped flange 48 with the extending rib 46 with only the thin lip 52 that is not bondable to the outer panel 28L-O. The local omission of bonding area is due to the process of sheet molding composition (SMC) formulations and bulk molding composition (BMC) formulations; hereafter referred to collectively as "molding compositions" that require a certain maximum thickness across the molded part to insure adequate curing and reasonable manufacturing times. Thus the void above 48I cannot be filled in with additional molding compound, and results in a small gap between the inner/outer panels and a water ingestion point. In an embodiment an expandable ethylene propylene diene monomer (EPDM) based foam sealant, which reacts during the paint cycle, may be used to seal-off this localized area where the adhesive bond is absent. The foam sealant is applied to the panel prior to bonding then expands during the paint bake cycle.

The foregoing description is illustrative of particular embodiments of the invention, but is not meant to be a limitation upon the practice thereof. The following claims, including all equivalents thereof, are intended to define the scope of the invention.

The invention claimed is:

1. A vehicle removable roof system comprising:
a vehicle fixed roof having a first finished surface panel joined to a first structural panel, where said first structural panel is configured with a mounting flange, said mounting flange having a first horizontal portion and a downward slope portion extending from said first horizontal portion toward a junction with a B-pillar of said vehicle;
one or more removable top panels, where each of said removable top panels have a second finished surface joined to a second structural panel, where said second structural panel is configured to engage said mounting flange of said vehicle fixed roof; and
a contoured dropped flange extending downward from said second structural panel toward the junction with the B-pillar to form a constant gap between said mounting flange of said first structural panel and said second structural panel in both the first horizontal portion and the downward slope portion.

2. The system of claim 1 further comprising a weather strip positioned in said constant gap along said first horizontal portion and said downward slope portion.

3. The system of claim 1 wherein said first structural panel and said second structural panel are formed of sheet molding composition (SMC).

4. The system of claim 1 wherein said first structural panel and said second structural panel are formed of bulk molding composition (BMC).

5. The system of claim 1 wherein said first structural panel mounts to a vehicle frame.

6. The system of claim 2 wherein said weather strip is compressed with an even downward pressure.

7. The system of claim 1 further comprising a 2-way locating pin on said first structural panel for interlocking with a locating receptacle of said one or more removable top panels.

8. The system of claim 1 wherein said dropped bond flange supports rib area.

9. A vehicle removable roof system comprising:
a vehicle fixed roof having a first finished surface panel joined to a first structural panel, where said first structural panel is configured with a mounting flange, said mounting flange having a first horizontal portion and a downward slope portion extending from said first horizontal portion toward a junction with a B-pillar of said vehicle;
one or more removable top panels, where each of said removable top panels have a second finished surface joined to a second structural panel, where said second structural panel is configured to engage said mounting flange of said vehicle fixed roof;

a contoured dropped bond flange extending downward from said second structural panel toward the junction with the B-pillar to form a constant gap between said mounting flange of said first structural panel and said second structural panel in both the first horizontal portion and the downward slope portion; and a weather strip positioned in said constant gap, where said weather strip is compressed with an even downward pressure.

10. The system of claim 9 wherein said first structural panel and said second structural panel are formed of sheet molding composition (SMC).

11. The system of claim 9 wherein said first structural panel and said second structural panel are formed of bulk molding composition (BMC).

12. The system of claim 9 wherein said first structural panel mounts to a vehicle frame.

13. The system of claim 9 further comprising a 2-way locating pin on said first structural panel for interlocking with a locating receptacle of said one or more removable top panels.

14. The system of claim 9 wherein said dropped bond flange supports rib area.

* * * * *